US012581552B2

(12) United States Patent　　　　　(10) Patent No.:　US 12,581,552 B2
Hahn　　　　　　　　　　　　　　　　　(45) Date of Patent:　　Mar. 17, 2026

(54) METHOD AND DEVICE FOR RELAY COMMUNICATION IN SIDELINK

(71) Applicants:HYUNDAI MOTOR COMPANY, Seoul (KR); KIA CORPORATION, Seoul (KR)

(72) Inventor:　Gene Back Hahn, Hwaseong-si (KR)

(73) Assignees: Hyundai Motor Company, Seoul (KR); Kia Corporation, Seoul (KR)

( * ) Notice:　Subject to any disclaimer, the term of this patent is extended or adjusted under 35 U.S.C. 154(b) by 414 days.

(21) Appl. No.:　18/030,204

(22) PCT Filed:　Oct. 25, 2021

(86) PCT No.:　PCT/KR2021/015041
　§ 371 (c)(1),
　(2) Date:　Apr. 4, 2023

(87) PCT Pub. No.: WO2022/092738
　PCT Pub. Date: May 5, 2022

(65)　　　　　Prior Publication Data
　US 2023/0379990 A1　　Nov. 23, 2023

Related U.S. Application Data

(60) Provisional application No. 63/106,026, filed on Oct. 27, 2020.

(30)　　　Foreign Application Priority Data

Oct. 25, 2021　(KR) ........................ 10-2021-0142568

(51) Int. Cl.
　*H04W 76/14*　　　(2018.01)
　*H04W 76/30*　　　(2018.01)
　*H04W 88/04*　　　(2009.01)

(52) U.S. Cl.
　CPC ........... *H04W 76/14* (2018.02); *H04W 76/30* (2018.02); *H04W 88/04* (2013.01)

(58) Field of Classification Search
　CPC ..... H04W 76/14; H04W 76/30; H04W 88/04; H04W 76/19; H04W 28/04; H04W 76/23; H04W 92/18
　See application file for complete search history.

(56)　　　　　References Cited

U.S. PATENT DOCUMENTS

2018/0027429 A1　1/2018　Li et al.
　2018/0206176 A1　7/2018　Panteleev et al.
　　　　　　　(Continued)

FOREIGN PATENT DOCUMENTS

KR　10-2017-0129917 A　11/2017
　KR　10-2018-0034524 A　4/2018
　　　　　　　(Continued)

OTHER PUBLICATIONS

International Search dated Feb. 3, 2022 issued in International Patent Application No. PCT/KR2021/015041.
　　　　　　　(Continued)

*Primary Examiner* — Kibrom T Hailu
(74) *Attorney, Agent, or Firm* — Morgan Lewis & Bockius LLP

(57)　　　　　ABSTRACT

A method and a device for relay communication in a sidelink are disclosed. A transmission terminal operation method comprises the steps of: performing first relay communication with a reception terminal through a first relay terminal; receiving a first message including a relay release indicator from the first relay terminal; setting a connection between a transmission terminal and a second relay terminal when the first message is received; and transmitting, through the first relay terminal, to the reception terminal, a second message including a first relay setting completion indicator for indi-
　　　　　　　(Continued)

cating that a connection setting between the transmission terminal and the second relay terminal is complete.

20 Claims, 8 Drawing Sheets

(56)                References Cited

U.S. PATENT DOCUMENTS

| | | |
|---|---|---|
| 2018/0213577 A1 | 7/2018 | Burbidge et al. |
| 2019/0037463 A1 | 1/2019 | Feng |
| 2021/0084555 A1* | 3/2021 | Feng ..................... H04W 76/14 |
| 2024/0015820 A1* | 1/2024 | Zhang .................. H04W 76/19 |

FOREIGN PATENT DOCUMENTS

| | | |
|---|---|---|
| KR | 10-2018-0125455 A | 11/2018 |
| WO | 2020/164613 A1 | 8/2020 |

OTHER PUBLICATIONS

Interdigital (Rapporteur), "Discussion, Decision," 3GPP TSG-RAN WG2 Meeting #111-e, Electronic—Aug. 17-28, 2020, R2-2008264.

* cited by examiner

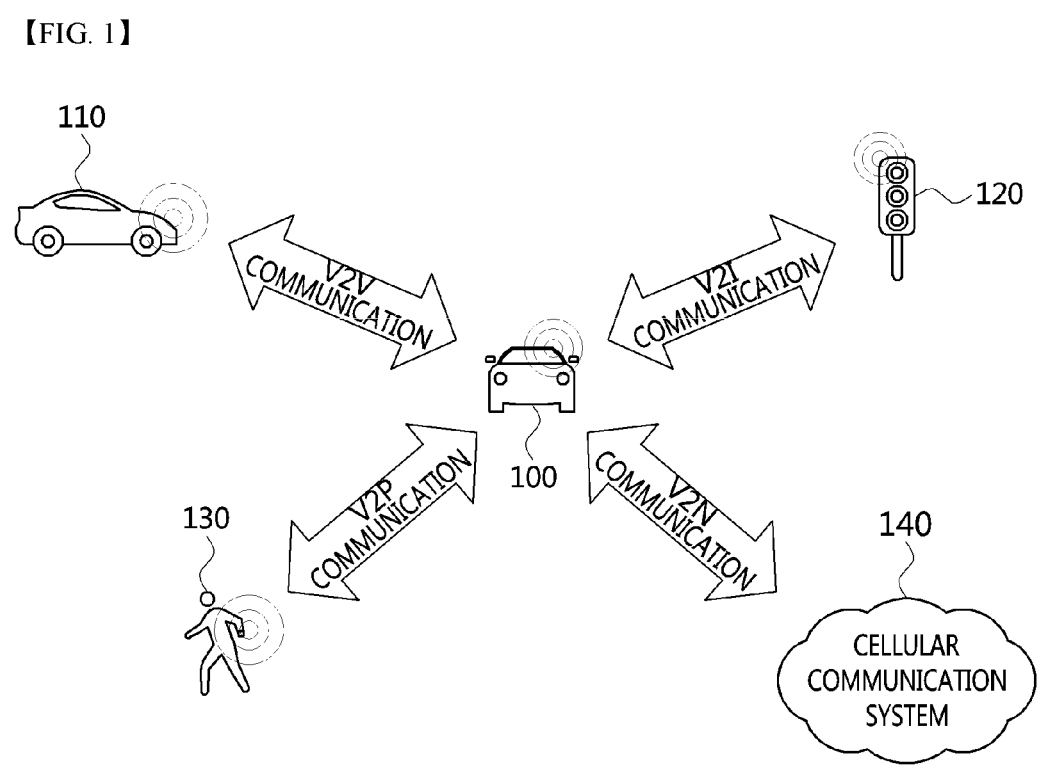

【FIG. 1】

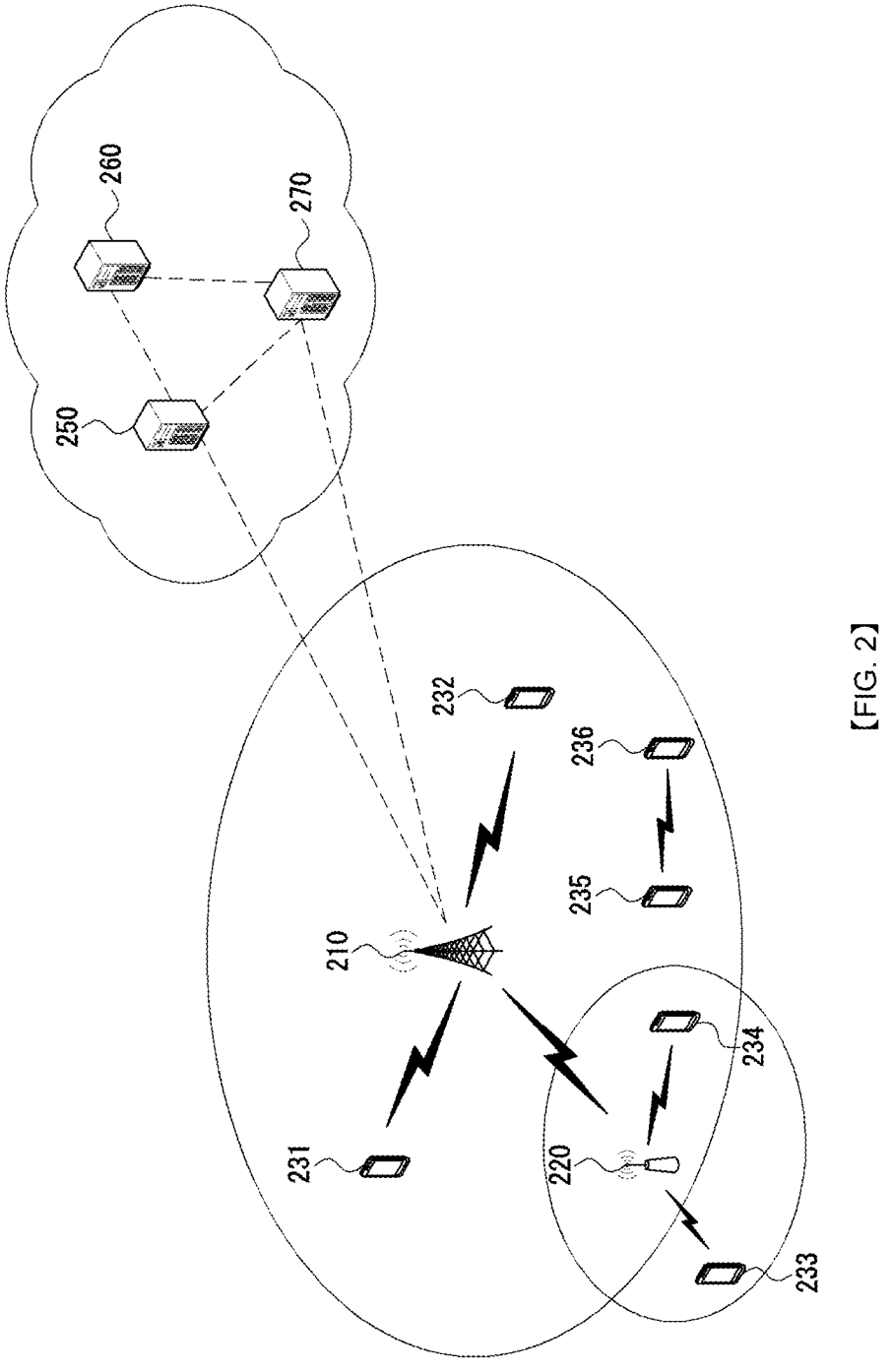
[FIG. 2]

【FIG. 3】
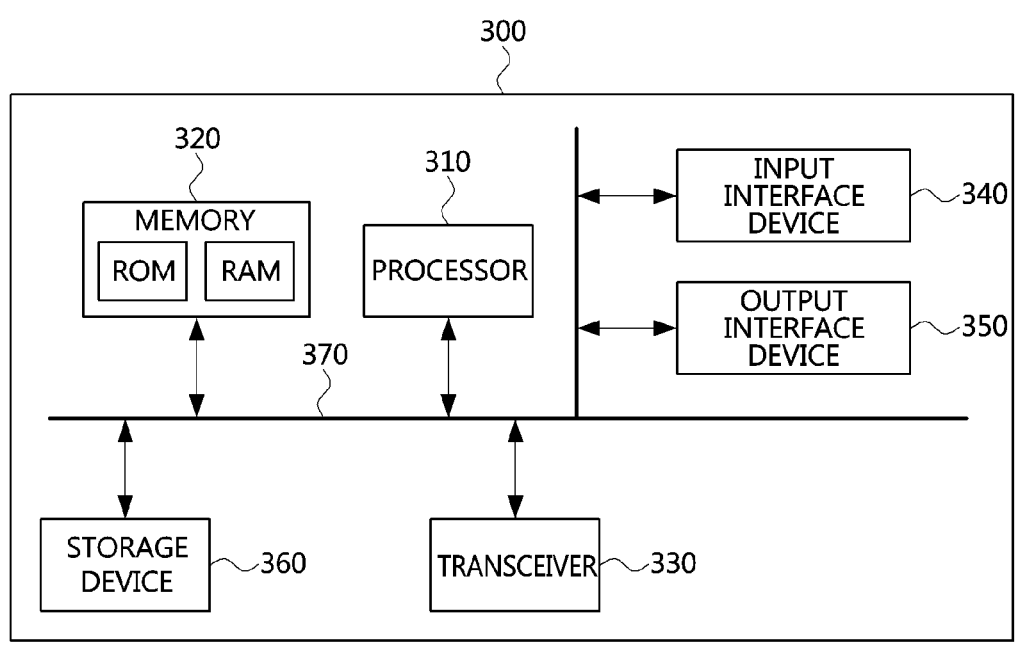
【FIG. 4】
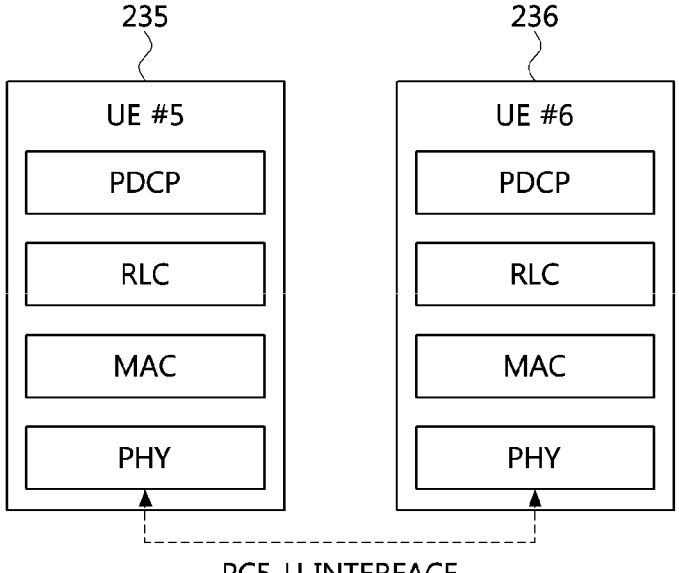

【FIG. 5】
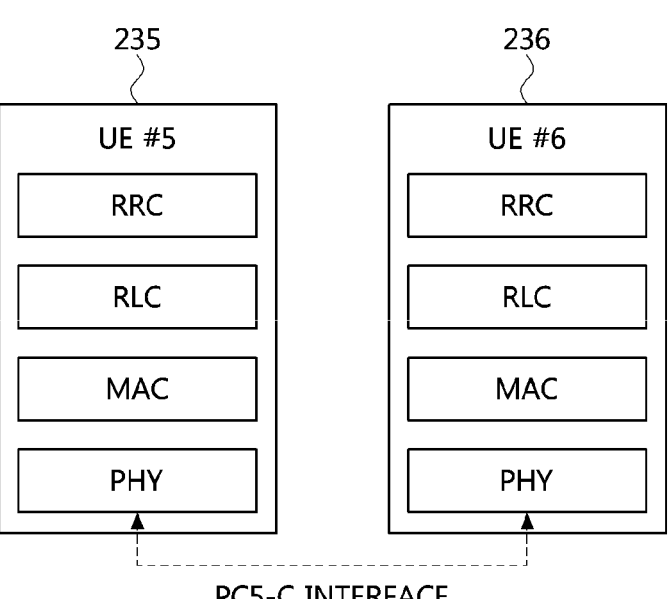
【FIG. 6】
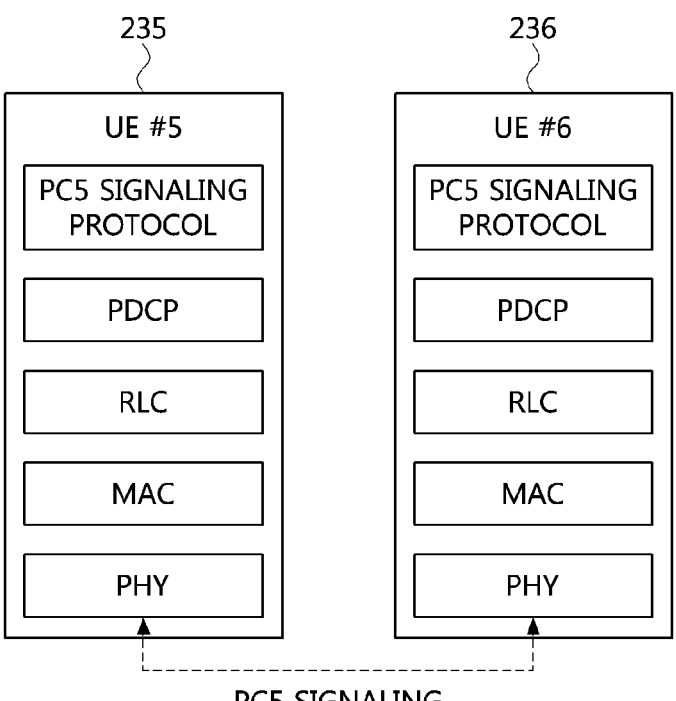

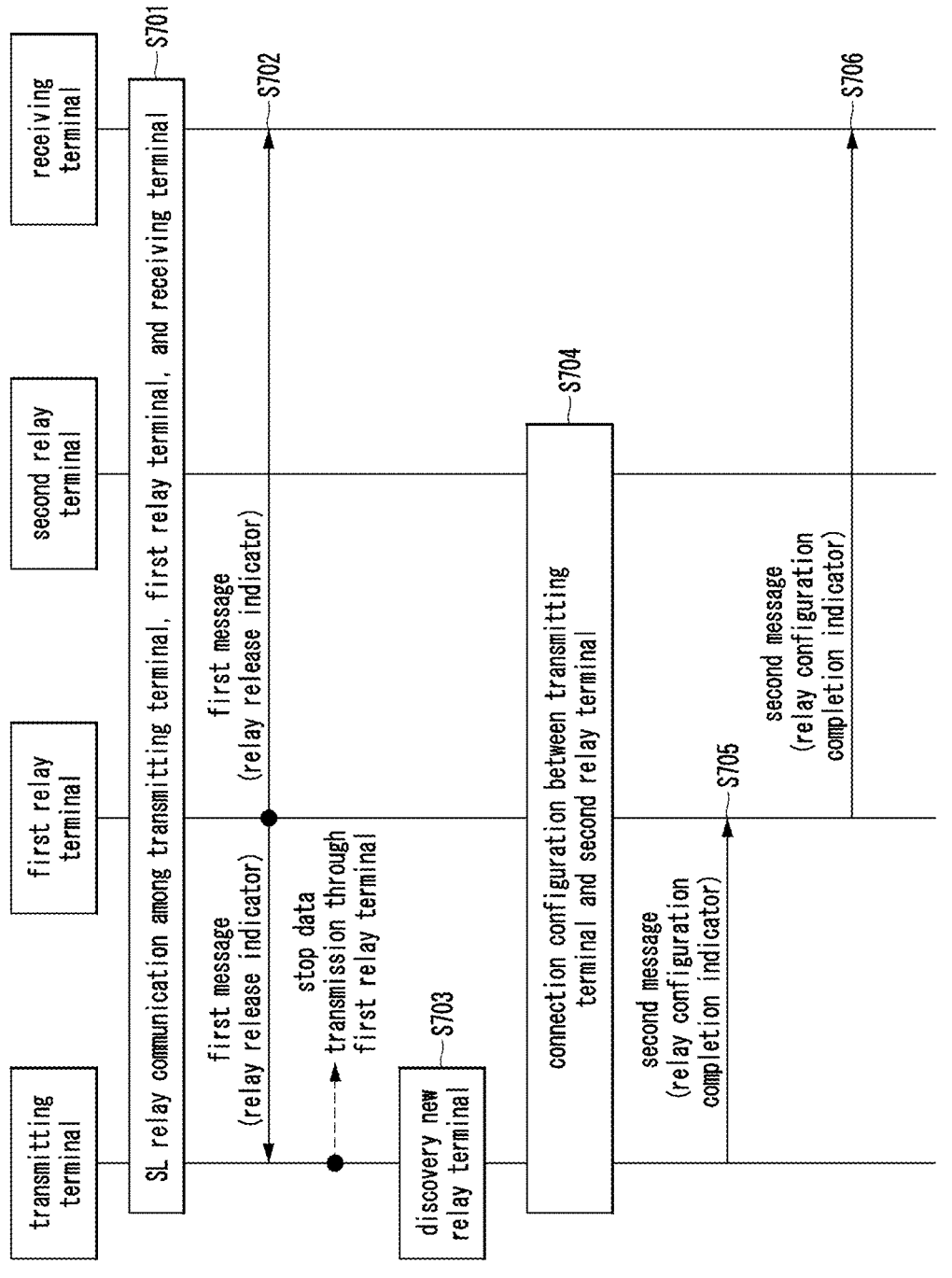
[FIG. 7A]

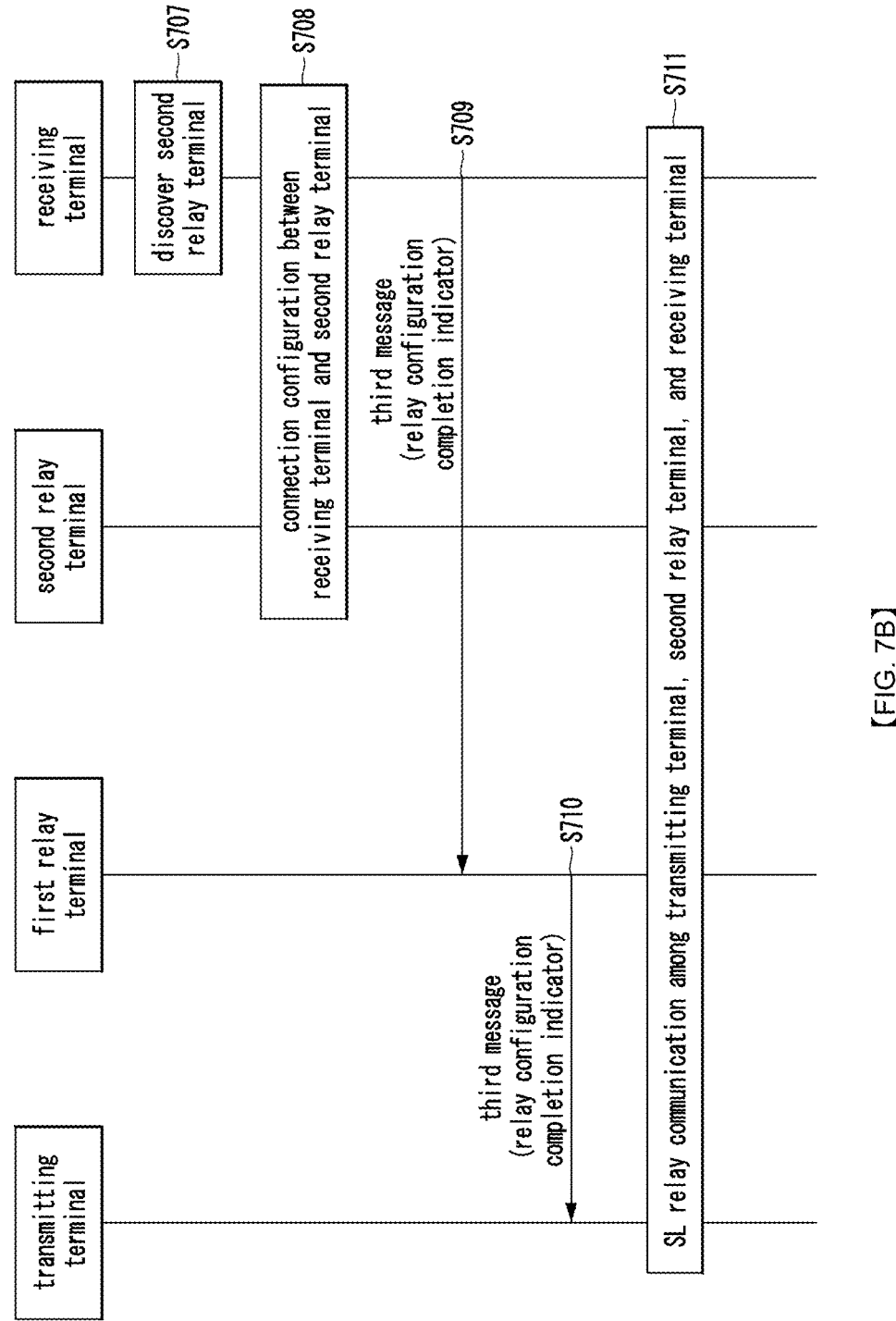
[FIG. 7B]

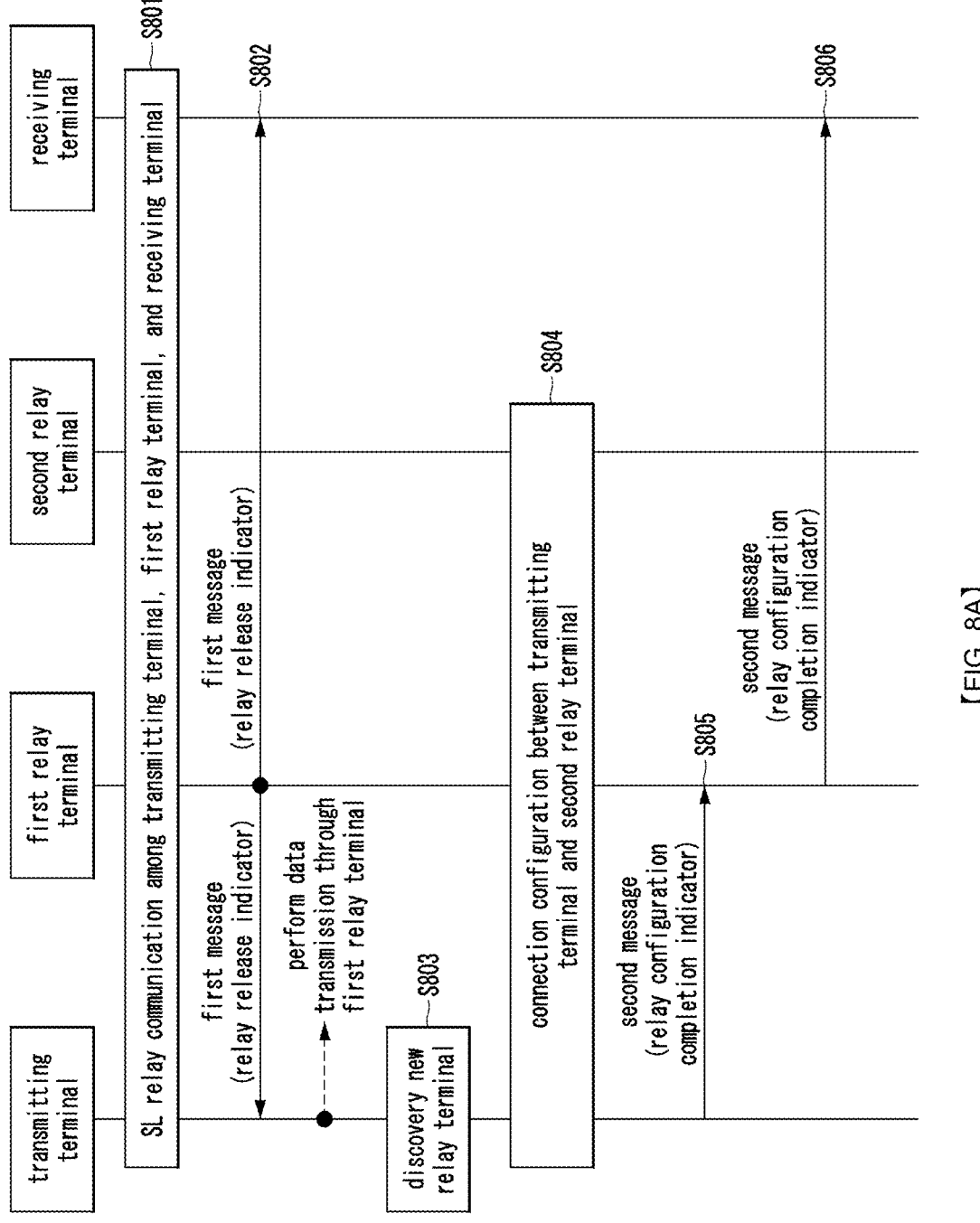
[FIG. 8A]

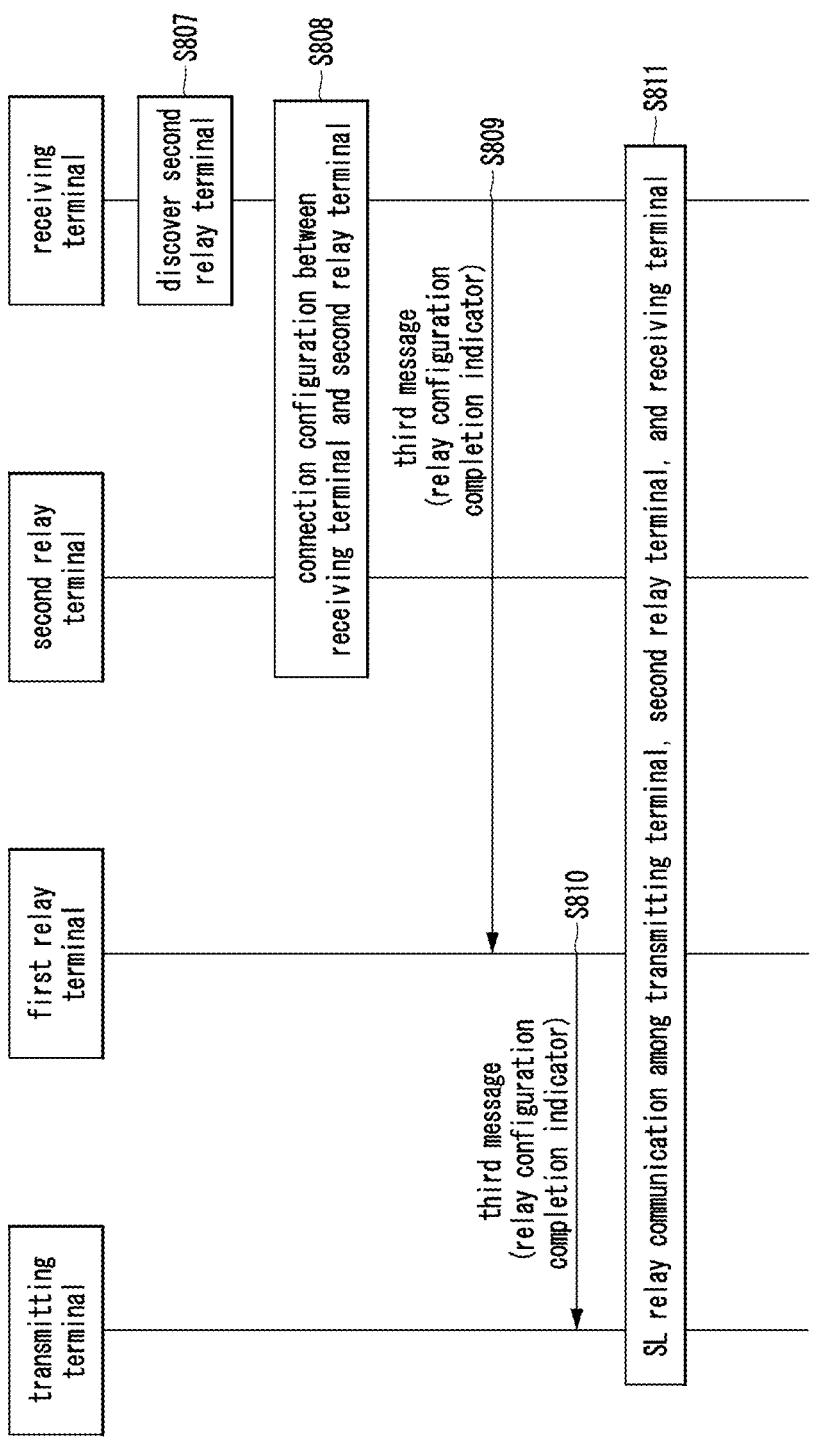
[FIG. 8B]

METHOD AND DEVICE FOR RELAY COMMUNICATION IN SIDELINK

CROSS-REFERENCE OF RELATED APPLICATIONS

This application is the U.S. National Phase under 35 U.S.C. § 371 of International Patent Application No. PCT/KR2021/015041, filed on Oct. 25, 2021, which claims priority to Korean Patent Application No. 10-2021-0142568, filed Oct. 25, 2021, and U.S. Provisional Patent Application Nos. 63/106,026, filed on Oct. 27, 2020, the disclosures of which are incorporated by reference herein in their entireties.

TECHNICAL FIELD

The present disclosure relates to a sidelink (SL) communication technique, and more particularly, to a technique for supporting SL relay communication through a new relay terminal.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink (SL) communication between a transmitting terminal and a receiving terminal may be performed in a relay manner. Relay communication performed through sidelinks may be referred to as SL relay communication. For the SL relay communication, a connection between the transmitting terminal and a relay terminal may be configured, and a connection between the relay terminal and the receiving terminal may be configured. The relay terminal may relay SL communication between the transmitting terminal and the receiving terminal. During the SL relay communication, a case in which the relay terminal cannot support the SL relay communication may occur. In this case, methods for performing SL relay communication through a new relay terminal are required.

DISCLOSURE

Technical Problem

The present disclosure is directed to providing a method and an apparatus for performing SL relay communication through a new relay terminal.

Technical Solution

An operation method of a transmitting terminal, according to a first exemplary embodiment of the present disclosure for achieving the above-described objective, may comprise: performing first sidelink (SL) relay communication with a receiving terminal through a first relay terminal; receiving, from the first relay terminal, a first message including a relay release indicator; in response to receiving the first message, configuring a connection between the transmitting terminal and a second relay terminal; transmitting, to the receiving terminal and through the first relay terminal, a second message including a first relay configuration completion indicator indicating that connection configuration between the transmitting terminal and the second relay terminal has been completed; receiving, through the first relay terminal, a third message including a second relay configuration completion indicator indicating that connection configuration between the receiving terminal and the second relay terminal has been completed; and in response to receiving the third message, performing second SL relay communication with the receiving terminal through the second relay terminal.

When the first message is received, a transmission operation for data of the transmitting terminal through the first relay terminal may be stopped.

Even when the first message is received, a transmission operation for data of the transmitting terminal through the first relay terminal may be performed, and the transmission operation may be stopped after receiving the third message.

The second message may further include at least one of information of the second relay terminal or a number for identifying data transmitted last by the transmitting terminal to the receiving terminal through the first relay terminal.

The third message may further include at least one of information of the receiving terminal, information of the second relay terminal, or a number for identifying data received last by the receiving terminal.

The configuring of the connection between the transmitting terminal and the second relay terminal may comprise: discovering one or more neighboring relay terminals; determining one neighboring relay terminal among one or more discovered neighboring relay terminals as the second relay terminal; and configuring a connection with the second relay terminal.

The performing of the second SL relay communication may comprise: transmitting data lost in the first SL relay communication to the receiving terminal through the second relay terminal; and transmitting new data to the receiving terminal through the second relay terminal.

When the third message is received, the connection configuration between the transmitting terminal and the first relay terminal may be released.

An operation method of a first relay terminal, according to a second exemplary embodiment of the present disclosure for achieving the above-described objective, may comprise: performing sidelink (SL) relay communication between a transmitting terminal and a receiving terminal; transmitting, to the transmitting terminal, a first message including a relay release indicator when the SL relay communication is not supported; receiving, from the transmitting terminal, a second message including a first relay configuration completion indicator indicating that connection configuration between the transmitting terminal and a second relay terminal has been completed; transmitting, to the receiving terminal, the second message; receiving, from the receiving terminal, a third message including a second relay configuration completion indicator indicating that connection configuration between the receiving terminal and the second relay terminal has been completed; transmitting, to the transmitting terminal, the third message; and after transmitting the third message, releasing the connection configuration between the transmitting terminal and the first relay terminal and the connection configuration between the receiving terminal and the first relay terminal.

After transmitting the first message, a relay operation for data of the transmitting terminal may be stopped.

Even after transmitting the first message, a relay operation for data of the transmitting terminal may be performed, and the relay operation may be stopped after transmitting the third message.

The second message may further include at least one of information of the transmitting terminal, information of the second relay terminal, or a number for identifying data transmitted last by the transmitting terminal to the receiving terminal through the first relay terminal.

The third message may further include at least one of information of the receiving terminal, information of the second relay terminal, or a number for identifying data received last by the receiving terminal.

An operation method of a receiving terminal, according to a third exemplary embodiment of the present disclosure for achieving the above-described objective, may comprise: performing first sidelink (SL) relay communication with a transmitting terminal through a first relay terminal; receiving, through the first relay terminal, a second message including a first relay configuration completion indicator indicating that connection configuration between the transmitting terminal and the second relay terminal has been completed; configuring a connection with the second relay terminal indicated by the second message; transmitting, to the transmitting terminal and through the first relay terminal, a third message including a second relay configuration completion indicator indicating that connection configuration between the receiving terminal and the second relay terminal has been completed; and after transmitting the third message, performing second SL relay communication with the transmitting terminal through the second relay terminal.

The operation method may further comprise, before receiving the second message, receiving, from the first relay terminal, a first message including a relay release indicator.

When the first message is received, a reception operation for data of the transmitting terminal relayed by the first relay terminal may be stopped.

Even when the first message is received, a reception operation for data of the transmitting terminal relayed by the first relay terminal may be performed, and the reception operation may be stopped after transmitting the third message.

The second message may further include at least one of information of the transmitting terminal, information of the second relay terminal, or a number for identifying data transmitted last by the transmitting terminal to the receiving terminal through the first relay terminal.

The third message may further include at least one of information of the second relay terminal or a number for identifying data received last by the receiving terminal.

The performing of the second SL relay communication may comprise: receiving data lost in the first SL relay communication through the second relay terminal; and receiving new data of the transmitting terminal through the second relay terminal.

Advantageous Effects

According to the present disclosure, SL relay communication between a transmitting terminal and a receiving terminal may be performed through a first relay terminal. When the SL relay communication through the first relay terminal is not supported, a connection between the transmitting terminal and a second relay terminal (i.e., new relay terminal) may be configured, and a connection between the receiving terminal and the second relay terminal may be configured. In this case, SL relay communication among the transmitting terminal, the second relay terminal, and the receiving terminal may be performed. Therefore, the SL relay communication can be performed efficiently.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIGS. 7A and 7B illustrate a sequence chart of a first exemplary embodiment of a method for SL relay communication through a new relay terminal.

FIGS. 8A and 8B illustrate a sequence chart of a second exemplary embodiment of a method for SL relay communication through a new relay terminal.

MODE FOR THE INVENTION

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, (re)transmission may mean 'transmission', 'retransmission', or 'transmission and retransmission', (re)configuration may mean 'configuration', 'reconfiguration', or 'configuration and reconfiguration', (re)connection may mean 'connection', 'reconnection', or 'connection and reconnection', and (re)access may mean 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include abase station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, a transmitting terminal may perform SL communication with a receiving terminal. The SL communication between the transmitting terminal and the receiving terminal may be performed in a unicast scheme. The transmitting terminal may refer to a terminal that transmits data (e.g., SL data) through a sidelink. That is, the transmitting terminal may refer to a source terminal. The receiving terminal may refer to a terminal that receives the SL data through the sidelink. That is, the receiving terminal may refer to a destination terminal. When relay communication (e.g., SL relay communication) is required during the SL communication between the transmitting terminal and the receiving terminal, a connection between the transmitting terminal and a relay terminal may be configured, and a connection between the receiving terminal and the relay terminal may be configured. When the above connection configuration is completed, SL relay communication may be performed.

The relay terminal may support SL relay communication between the transmitting terminal and the receiving terminal. When a specific event occurs, the relay terminal may determine not to support a relay function (e.g., SL relay communication). Alternatively, a situation in which the relay terminal cannot support the relay function (e.g., SL relay communication) may occur. In the above cases, SL relay communication through a new relay terminal may be required. Below, methods for SL relay communication through a new relay terminal will be described.

FIGS. 7A and 7B illustrate a sequence chart of a first exemplary embodiment of a method for SL relay communication through a new relay terminal.

As shown in FIGS. 7A and 7B, a communication system may include a transmitting terminal, a receiving terminal, a first relay terminal, and a second relay terminal. Each of the transmitting terminal, receiving terminal, first relay terminal, and second relay terminal may be configured identically or similarly to the communication node 300 shown in FIG.

terminal may be a terminal that relays SL communication between the transmitting terminal and the receiving terminal. The second relay terminal may be a new relay terminal.

A connection (e.g., unicast link) between the transmitting terminal and the first relay terminal may be configured, and SL communication between the transmitting terminal and the first relay terminal may be performed in a unicast scheme. A connection (e.g., unicast link) between the receiving terminal and the first relay terminal may be configured, and SL communication between the receiving terminal and the first relay terminal may be performed in a unicast scheme. In a step S701, SL relay communication among the transmitting terminal, the first relay terminal, and the receiving terminal may be performed.

When a specific event occurs, the first relay terminal may determine not to support a relay function (e.g., SL relay communication). Alternatively, a situation in which the first relay terminal cannot support a relay function (e.g., SL relay communication) may occur. In the above cases, the first relay terminal may transmit a first message including a 'relay release indicator' indicating that SL relay communication is not supported by the first relay terminal to the transmitting terminal and/or the receiving terminal (S702). The relay release indicator may indicate that the first relay terminal is to stop the SL relay communication. In addition, the relay release indicator may be used to request the transmitting terminal and/or the receiving terminal to configure a connection with a new relay terminal (e.g., second relay terminal).

The first message may be an RRCReconfigurationRequestSidelink message, and the RRCReconfigurationRequestSidelink message may include one or more information elements listed in Table 3 below. In the step S702, another RRC message (e.g., the existing RRC message or a new RRC message) may be used instead of the RRCReconfigurationRequestSidelink message. Alternatively, the first message may be a MAC control element (CE) or control information (e.g., SCI). In Table 3 below, RelayReleaseindication may be the relay release indicator. The RRCReconfigurationRequestSidelink message may be used to convey RelayRelease-indication.

TABLE 3

| RRCReconfigurationRequestSidelink message |
|---|

```
-- ASN1START
-- TAG-RRCRECONFIGURATIONREQUESTSIDELINK-START
RRCReconfigurationRequestSidelink ::=          SEQUENCE {
    rrc-TransactionIdentifier-r17              RRC-TransactionIdentifier,
    criticalExtensions                         CHOICE {
        rrcReconfigurationRequestSidelink-r17           RRCReconfigurationRequestSidelink-
IEs-r17,
        criticalExtensionsFuture                        SEQUENCE { }
    }
}
RRCReconfigurationRequestSidelink-IEs-r17 ::=       SEQUENCE {
    RelayRelease-Indication-r17                     ENUMERATED {TRUE}     OPTIONAL,
    lateNonCriticalExtension                        OCTET STRING          OPTIONAL,
    nonCriticalExtension                            SEQUENCE { }          OPTIONAL
}
-- TAG-RRCRECONFIGURATIONSIDELINK-STOP
-- ASN1STOP
```

3. The transmitting terminal, receiving terminal, first relay terminal, and second relay terminal may support the protocol stack(s) shown in FIGS. 4 to 6. The transmitting terminal may be a terminal transmitting data (e.g., SL data), and the receiving terminal may be a terminal receiving the data (e.g., SL data). Each of the first relay terminal and the second relay The transmitting terminal and/or the receiving terminal may receive the first message from the first relay terminal, and may determine that the first relay terminal is not to support (e.g., not to perform) SL relay communication based on the relay release indicator included in the first message. In this case, the transmitting terminal may stop transmitting data (e.g., SL data, unicast traffic) to the first relay terminal. In addition, the first relay terminal may stop relaying data from the transmitting terminal, and the receiving terminal may stop receiving data from the first relay terminal.

The transmitting terminal may perform a discovery procedure for a new relay terminal (S703). For example, the transmitting terminal may identify neighboring relay terminal(s) by receiving signal(s) and/or channel(s) from the neighboring relay terminal(s). Here, the signal may be at least one of a discovery signal, reference signal, or synchronization signal, and the channel may be a discovery channel. The transmitting terminal may select one neighboring relay terminal (e.g., optimal neighboring relay terminal) from among the identified neighboring relay terminal(s), and may determine the selected neighboring relay terminal as a new relay terminal. Here, the new relay terminal may be the second relay terminal.

The transmitting terminal may configure a connection (e.g., PC5 connection or PC5-S connection) with the second relay terminal (S704). In the step S704, the transmitting relay terminal, a second message including information of the second relay terminal (e.g., identifier of the second relay terminal) and/or a relay configuration completion indicator indicating that the connection configuration between the transmitting terminal and the second relay terminal has been completed (S705). The relay configuration completion indicator may indicate that data of the transmitting terminal is relayed to the receiving terminal through the second relay terminal. The second message may be transmitted to the receiving terminal through the first relay terminal. That is, the second message may be used to inform the receiving terminal of the information of the second relay terminal (i.e., new relay terminal).

The second message may be an RRCReconfiguration-Sidelink message defined in Table 4 below, and may include one or more information elements listed in Table 4 below. In the step S705, another RRC message (e.g., new RRC message) may be used instead of the RRCReconfiguration-Sidelink message. Alternatively, the second message may be a MAC CE and/or control information.

TABLE 4

| RRCReconfigurationSidelink message |
|---|
| -- ASN1START |
| -- TAG-RRCRECONFIGURATIONSIDELINK-START |
| RRCReconfigurationSidelink ::=                    SEQUENCE { |
|     rrc-TransactionIdentifier-r16             RRC-TransactionIdentifier, |
|     criticalExtensions                    CHOICE { |
|         rrcReconfigurationSidelink-r16         RRCReconfigurationSidelink-IEs-r16, |
|         criticalExtensionsFuture           SEQUENCE { } |
|     } |
| } |
| RRCReconfigurationSidelink-IEs-r16 ::=        SEQUENCE { |
|     slrb-ConfigToAddModList-r16           SEQUENCE (SIZE (1..maxNrofSLRB-r16)) OF |
| SLRB-Config-r16                      OPTIONAL, |
|     slrb-ConfigToReleaseList-r16           SEQUENCE (SIZE (1..maxNrofSLRB-r16)) OF |
| SLRB-PC5-ConfigIndex-r16             OPTIONAL, |
|     sl-MeasConfig-r16                 SL-MeasConfig-r16  OPTIONAL, |
|     sl-CSI-RS-Config-r16              SL-CSI-RS-Config-r16 |
|       OPTIONAL, |
|     lateNonCriticalExtension           OCTET STRING |
|       OPTIONAL, |
|     nonCriticalExtension              RRCReconfigurationSidelink-IEs-r17 |
|       OPTIONAL |
| } |
| RRCReconfigurationSidelink-IEs-r17 ::=        SEQUENCE { |
|     sl-RelayUE-Identity-r17             SL-RelayUE-Identity-r17 |
|       OPTIONAL, |
|   RelayLinkRefresh-Indication-r17        ENUMERATED {Re-established, Not- |
| reestablished}  OPTIONAL, |
| ... |
| } |
| ... Omitted ... | terminal may identify an identifier of the second relay terminal. The identifier of the second relay terminal may be a layer 2 (L2) identifier and/or a ProSe UE ID (e.g., ProSe application code or ProSe application ID). The ProSe UE ID may correspond to the L2 identifier. The ProSe UE ID may be an identifier recognizable by a higher layer. Since a transmission operation of a discovery message (e.g., discovery signal or discovery channel) may be performed in the higher layer and/or lower layer (e.g., PDCP, RRC, or MAC layer), in order to support the transmission operation of the discovery message, the identifier of the second relay terminal may be the L2 identifier, the ProSe UE ID, or a combination of the L2 identifier and the ProSe UE ID.

When the connection configuration between the transmitting terminal and the second relay terminal has been completed, the transmitting terminal may transmit, to the first In Table 4, sl-RelayUE-Identity may be the identifier of the second relay terminal (i.e., new relay terminal). In Table 4, RelayLinkRefresh-Indication may be the relay configuration completion indicator. The RelayLinkRefresh-Indication may indicate that the connection configuration between the transmitting terminal and the relay terminal indicated by sl-RelayUE-Identity has been completed. The RelayLinkRefresh-Indication may be expressed in ENUMERATED or BOOLEAN type.

In addition, the second message may further include a number (hereinafter, referred to as 'last data number') for identifying data transmitted last from the transmitting terminal to the receiving terminal through the first relay terminal. The last data number may be a hyper frame number. The last data number may be used by the receiving terminal to determine whether or not data has been lost. Alternatively, when the RRCReconfigurationComplete message of the receiving terminal is received through the first relay terminal, the transmitting terminal may transmit a identifier of the transmitting terminal. The identifier of the transmitting terminal may be an L2 identifier, ProSe UE ID, ProSe application code, and/or ProSe application ID.

TABLE 5

| RRCReconfigurationSidelink message |
|---|
| -- ASN1START |
| -- TAG-RRCRECONFIGURATIONSIDELINK-START |

| | |
|---|---|
| RRCReconfigurationSidelink ::= | SEQUENCE { |
|     rrc-TransactionIdentifier-r16 | RRC-TransactionIdentifier, |
|     criticalExtensions | CHOICE { |
|         rrcReconfigurationSidelink-r16 | RRCReconfigurationSidelink-IEs-r16, |
|         criticalExtensionsFuture | SEQUENCE { } |
|     } | |
| } | |
| RRCReconfigurationSidelink-IEs-r16 ::= | SEQUENCE { |
|     slrb-ConfigToAddModList-r16 | SEQUENCE (SIZE (1..maxNrofSLRB-r16)) OF |
| SLRB-Config-r16 | OPTIONAL, |
|     slrb-ConfigToReleaseList-r16 | SEQUENCE (SIZE (1..maxNrofSLRB-r16)) OF |
| SLRB-PC5-ConfigIndex-r16 | OPTIONAL, |
|     sl-MeasConfig-r16 | SL-MeasConfig-r16   OPTIONAL, |
|     sl-CSI-RS-Config-r16 | SL-CSI-RS-Config-r16 |
|     OPTIONAL, | |
|     lateNonCriticalExtension | OCTET STRING |
|     OPTIONAL, | |
|     nonCriticalExtension | RRCReconfigurationSidelink-IEs-r17 |
|     OPTIONAL | |
| } | |
| RRCReconfigurationSidelink-IEs-r17 ::= | SEQUENCE { |
|     sl-SourceUE-Identity-r17 | SL-SourceUE-Identity-r17 |
|         OPTIONAL, | |
|     sl-RelayUE-Identity-r17 | SL-RelayUE-Identity-r17 |
|         OPTIONAL, | |
|     RelayLinkRefresh-Indication-r17 | ENUMERATED {Re-established, Not- |
| reestablished}   OPTIONAL, | |
|     ... | |
| } | |
| ... Omitted ... | | separate message including the last data number (e.g., hyper frame number) to the receiving terminal through the first relay terminal. The receiving terminal may receive the separate message from the first relay terminal after transmitting the RRCReconfigurationComplete message, identify the last data number included in the separate message, and identify whether or not data has been lost based on the last data number.

On the other hand, the first relay terminal may receive the second message from the transmitting terminal. The first relay terminal may identify information elements included in the second message (e.g., information of the second relay terminal, relay configuration completion indicator, and/or last data number). The first relay terminal may transmit the second message to the receiving terminal (S706). The information elements included in the second message transmitted from the first relay terminal may be the same as information elements included in the second message transmitted from the transmitting terminal. Alternatively, the information elements included in the second message transmitted from the first relay terminal may be different from the information elements included in the second message transmitted from the transmitting terminal. For example, the second message transmitted from the first relay terminal may further include information (e.g., identifier) of the transmitting terminal delivering the information of the new relay terminal (e.g., second relay terminal). The second message transmitted from the first relay terminal may be an RRCReconfigurationSidelink message defined in Table 5 below, and may include one or more information elements described in Table 5 below. In Table 5 below, sl-Source UE-Identity may be the The receiving terminal may receive the second message of the transmitting terminal from the first relay terminal, and identify information elements included in the second message (e.g., information of the second relay terminal, relay configuration completion indicator, last data number, and/or information of the transmitting terminal). The receiving terminal may identify that configuration of a connection (e.g., unicast link) between the transmitting terminal and the second relay terminal (e.g., new relay terminal) has been completed based on the information elements included in the second message. The receiving terminal may perform a discovery procedure for the second relay terminal indicated by the information element included in the second message (S707). For example, the receiving terminal may identify identifier(s) of neighboring relay terminal(s) by receiving signal(s) and/or channel(s) from the neighboring relay terminal(s). The signal may be a discovery signal, synchronization signal, and/or reference signal, and the channel may be a discovery channel.

The receiving terminal may compare the identifier(s) of the neighboring relay terminal(s) with the identifier of the second relay terminal included in the second message. Here, the higher layer of the receiving terminal may compare Prose UE ID(s) (e.g., ProSe application code(s) or ProSe application ID(s)) of the neighboring relay terminal(s) and the Prose UE ID (e.g., ProSe application code or ProSe application ID) of the second relay terminal. Alternatively, the lower layer (e.g., L2) of the receiving terminal may compare L2 identifier(s) of the neighboring relay terminal(s) with the L2 identifier of the second relay terminal.

When a neighboring relay terminal having the same identifier as that of the second relay terminal is identified, the receiving terminal may determine the identified neighboring relay terminal as the second relay terminal. The receiving terminal may configure a connection (e.g., PC5 connection, PC5-S connection, or unicast link) with the second relay terminal (S708). When the connection configuration between the receiving terminal and the second relay terminal has been completed, the receiving terminal may transmit, to the first relay terminal, a third message including information of the second relay terminal (e.g., identifier of the second relay terminal) and/or a relay configuration completion indicator indicating that the connection configuration between the receiving terminal and the second relay terminal has been completed (S709). The third message may be transmitted to the transmitting terminal through the first relay terminal. The third message may be an RRCReconfigurationCompleteSidelink message defined in Table 6 below, and may include one or more information elements listed in Table 6 below. In the S709, another RRC message (e.g., a new RRC message) may be used instead of the RRCReconfigurationCompleteSidelink message. Alternatively, the third message may be a MAC CE and/or control information. In Table 6 below, sl-RelayUE-Identity may be the identifier of the second relay terminal, and in Table 6 below, RelayLinkRefresh-Indication may be the relay configuration completion indicator. The RelayLinkRefresh-Indication may be expressed in ENUMERATED or BOOLEAN type.

received last from the first relay terminal. The receiving terminal may request the transmitting terminal to retransmit the data corresponding to the last data number by informing the transmitting terminal of the last data number. The last data number may be included in the third message (e.g., RRCReconfigurationCompleteSidelink message).

Alternatively, the receiving terminal may generate a separate message including the last data number, and transmit the separate message to the transmitting terminal through the first relay terminal. Alternatively, when the connection configuration between the receiving terminal and the second relay terminal has failed, the receiving terminal may transmit an RRCReconfigurationFailure message to the transmitting terminal through the first relay terminal. Here, the RRCReconfigurationFailure message may include the last data number of the receiving terminal. The transmitting terminal may identify the last data number of the receiving terminal by receiving the third message, separate message, and/or RRCReconfigurationFailure message from the first relay terminal, and retransmit the data corresponding to the last data number to the receiving terminal. The retransmission operation of the data may be performed through the first relay terminal or the second relay terminal. The retransmission operation of the data may be performed when the number for identifying the data transmitted last by the transmitting terminal through the first relay terminal is different from the last data number received from the receiving terminal.

TABLE 6

| RRCReconfigurationCompleteSidelink message |
| --- |

```
-- ASN1START
-- TAG-RRCRECONFIGURATIONCOMPLETESIDELINK-START
RRCReconfigurationCompleteSidelink ::=        SEQUENCE {
    rrc-TransactionIdentifier-r16             RRC-TransactionIdentifier,
    criticalExtensions                        CHOICE {
        rrcReconfigurationCompleteSidelink-r16        RRCReconfigurationCompleteSidelink-
IEs-r16,
        criticalExtensionsFuture              SEQUENCE { }
    }
}
RRCReconfigurationCompleteSidelink-IEs-r16 ::= SEQUENCE {
    lateNonCriticalExtension                          OCTET STRING
OPTIONAL,
    nonCriticalExtension                      RRCReconfigurationSidelink-IEs-r17
    OPTIONAL
}
RRCReconfigurationSidelink-IEs-r17 ::=        SEQUENCE {
    sl-RelayUE-Identity-r17                   SL-RelayUE-Identity-r17
        OPTIONAL,
    RelayLinkRefresh-Indication-r17               ENUMERATED {Re-established, Not-
reestablished}  OPTIONAL,
    ...
}
-- TAG-RRCRECONFIGURATIONCOMPLETESIDELINK-STOP
-- ASN1STOP
```

Meanwhile, the receiving terminal may identify whether data has been lost in the SL relay communication through the first relay terminal based on the last data number included in the second message. When a number for identifying data last received from the first relay terminal is the same as the last data number included in the second message, the receiving terminal may determine that data has not been lost in the SL relay communication. When the number for identifying data last received from the first relay terminal is different from the last data number included in the second message, the receiving terminal may determine that data has been lost in the SL relay communication. In this case, the receiving terminal may inform the transmitting terminal of the number (e.g., last data number) for identifying the data On the other hand, the first relay terminal may receive the third message from the receiving terminal. The first relay terminal may identify information elements included in the third message (e.g., information of the second relay terminal, relay configuration completion indicator, and/or last data number). The first relay terminal may transmit the third message to the transmitting terminal (S710). After transmitting the third message to the transmitting terminal, the first relay terminal may release the connection (e.g., unicast link) between the transmitting terminal and the first relay terminal and the connection (e.g., unicast link) between the receiving terminal and the first relay terminal. In addition, the transmitting terminal may release the connection configuration between the transmitting terminal and the first relay terminal after receiving the third message. The receiving terminal may release the connection configuration between the receiving terminal and the first relay terminal after transmitting the third message.

The information elements included in the third message transmitted from the first relay terminal may be the same as the information elements included in the third message transmitted from the receiving terminal. Alternatively, the information elements included in the third message transmitted from the first relay terminal may be different from the information elements included in the third message transmitted from the receiving terminal. For example, the third message transmitted from the first relay terminal may further include information (e.g., identifier) of the receiving terminal delivering the information of the new relay terminal (e.g., second relay terminal). The third message transmitted from the first relay terminal may be an RRCReconfigurationCompleteSidelink message defined in Table 7 below, and may include one or more information elements described in Table 7 below. In Table 7 below, sl-Destination UE-Identity may be the identifier of the receiving terminal. The identifier of the receiving terminal may be an L2 identifier, ProSe UE ID, ProSe application code, and/or ProSe application ID.

second relay terminal. When data has been lost in the SL relay communication through the first relay terminal, the transmitting terminal may retransmit the lost data to the receiving terminal through the second relay terminal before transmitting new data. On the other hand, when the third message of the receiving terminal is not received, the transmitting terminal may not be able to perform the SL relay communication through the second relay terminal.

Meanwhile, when it is determined that the first relay terminal cannot support SL relay communication in the exemplary embodiments illustrated in FIGS. 7A and 7B, data transmission through the first relay terminal may be stopped. Alternatively, even when it is determined that the first relay terminal cannot support SL relay communication, data transmission through the first relay terminal may be continuously performed without interruption. The SL relay communication in accordance therewith may be performed as follows. That is, even when it is determined that the first relay terminal cannot support SL relay communication in exemplary embodiments shown in FIGS. 8A and 8B below, data transmission through the first relay terminal may be performed before data transmission through the new relay terminal (e.g., second relay terminal) is performed.

TABLE 7

| RRCReconfigurationCompleteSidelink message |
|---|

```
-- ASN1START
-- TAG-RRCRECONFIGURATIONCOMPLETESIDELINK-START
RRCReconfigurationCompleteSidelink ::=        SEQUENCE {
    rrc-TransactionIdentifier-r16               RRC-TransactionIdentifier,
    criticalExtensions                          CHOICE {
        rrcReconfigurationCompleteSidelink-r16            RRCReconfigurationCompleteSidelink-
IEs-r16,
        criticalExtensionsFuture                SEQUENCE { }
    }
}
RRCReconfigurationCompleteSidelink-IEs-r16 ::= SEQUENCE {
    lateNonCriticalExtension                          OCTET STRING
OPTIONAL,
    nonCriticalExtension                    RRCReconfigurationSidelink-IEs-r17
    OPTIONAL
}
RRCReconfigurationSidelink-IEs-r17 ::=       SEQUENCE {
    sl-DestinationUE-Identity-r17                SL-SourceUE-Identity-r17
        OPTIONAL,
    sl-RelayUE-Identity-r17                   SL-RelayUE-Identity-r17
        OPTIONAL,
    RelayLinkRefresh-Indication-r17               ENUMERATED {Re-established, Not-
reestablished}   OPTIONAL,
    ...
}
-- TAG-RRCRECONFIGURATIONCOMPLETESIDELINK-STOP
-- ASN1STOP
```

The transmitting terminal may receive the third message from the first relay terminal, and identify the information elements included in the third message (e.g., information of the second relay terminal, relay configuration completion indicator, last data number, and/or information of the receiving terminal). The transmitting terminal may identify that the connection configuration between the receiving terminal and the second relay terminal has been completed based on the information elements included in the third message. In this case, SL relay communication among the transmitting terminal, the second relay terminal, and the receiving terminal may be performed (S711). The transmitting terminal may transmit new data to the receiving terminal through the second relay terminal, and the receiving terminal may receive the new data of the transmitting terminal through the FIGS. 8A and 8B illustrate a sequence chart of a second exemplary embodiment of a method for SL relay communication through a new relay terminal.

As shown in FIGS. 8A and 8B, a communication system may include a transmitting terminal, a receiving terminal, a first relay terminal, and a second relay terminal. Each of the transmitting terminal, receiving terminal, first relay terminal, and second relay terminal may be configured identically or similarly to the communication node 300 shown in FIG. 3. The transmitting terminal, receiving terminal, first relay terminal, and second relay terminal may support the protocol stack(s) shown in FIGS. 4 to 6. The transmitting terminal may be a terminal transmitting data (e.g., SL data), and the receiving terminal may be a terminal receiving the data (e.g., SL data). Each of the first relay terminal and the second relay terminal may be a terminal that relays SL communication between the transmitting terminal and the receiving terminal. The second relay terminal may be a new relay terminal.

A connection (e.g., unicast link) between the transmitting terminal and the first relay terminal may be configured, and SL communication between the transmitting terminal and the first relay terminal may be performed in a unicast scheme. A connection (e.g., unicast link) between the receiving terminal and the first relay terminal may be configured, and SL communication between the receiving terminal and the first relay terminal may be performed in a unicast scheme. SL relay communication among the transmitting terminal, the first relay terminal, and the receiving terminal may be performed (S801).

When a specific event occurs, the first relay terminal may determine not to support a relay function (e.g., SL relay communication). Alternatively, a situation in which the first relay terminal cannot support a relay function (e.g., SL relay communication) may occur. In the above cases, the first relay terminal may transmit a first message including a 'relay release indicator' indicating that SL relay communication is not supported by the first relay terminal to the transmitting terminal and/or the receiving terminal (S802). The relay release indicator may indicate that data transmission through the first relay terminal is allowed until connection configuration with a new relay terminal (e.g., second relay terminal) is completed. In this case, the transmitting terminal may transmit data through the first relay terminal until connection configuration between the receiving terminal and the new relay terminal is completed (e.g., until a third message including a relay configuration completion indicator is received). In addition, the relay release indicator may be used to request the transmitting terminal and/or the receiving terminal to configure a connection with a new relay terminal (e.g., second relay terminal).

The first message may be an RRCReconfigurationRequestSidelink message, and the RRCReconfigurationRequestSidelink message may include one or more information elements listed in Table 8 below. In the step S802, another RRC message (e.g., the existing RRC message or a new RRC message) may be used instead of the RRCReconfigurationRequestSidelink message. Alternatively, the first message may be a MAC CE or control information. In Table 3 below, ADCS-RelayRelease-indication may be the relay release indicator. The RRCReconfigurationRequestSidelink message may be used to convey ADCS-RelayRelease-indication. 'ADCS' may refer to 'after dual connection setup'.

The transmitting terminal and/or the receiving terminal may receive the first message from the first relay terminal, and determine that the first relay terminal is not to support (e.g. is not to perform) SL relay communication based on the relay release indicator included in the first message. When the relay release indicator is ADCS-RelayRelease-Indication, the transmitting terminal may continue to transmit data (e.g., SL data, unicast traffic) through the first relay terminal. The data transmission through the first relay terminal may be performed until a connection with the new relay terminal is configured. In addition, the first relay terminal may relay data of the transmitting terminal until a connection is configured between the transmitting terminal/receiving terminal and the new relay terminal. The receiving terminal may perform an operation of receiving data from the first relay terminal until the connection with the new relay terminal is configured.

The transmitting terminal may perform a discovery procedure for the new relay terminal (S803). For example, the transmitting terminal may identify neighboring relay terminal(s) by receiving signal(s) and/or channel(s) from the neighboring relay terminal(s). Here, the signal may be at least one of a discovery signal, reference signal, or synchronization signal, and the channel may be a discovery channel. The transmitting terminal may select one neighboring relay terminal (e.g., optimal neighboring relay terminal) from the identified neighboring relay terminal(s), and may determine the selected neighboring relay terminal as the new relay terminal. Here, the new relay terminal may be the second relay terminal.

The transmitting terminal may configure a connection (e.g., PC5 connection or PC5-S connection) with the second relay terminal (S804). In the step S804, the transmitting terminal may identify an identifier of the second relay terminal. The identifier of the second relay terminal may be an L2 identifier and/or ProSe UE ID (e.g., ProSe application code or ProSe application ID). The Prose UE ID may correspond to the L2 identifier. The ProSe UE ID may be an identifier recognizable by a higher layer. Since a transmission operation of a discovery message (e.g., discovery signal or discovery channel) may be performed in the higher layer and/or lower layer (e.g., PDCP, RRC, or MAC layer), in order to support the transmission operation of the discovery message, the identifier of the second relay terminal may be

TABLE 8

RRCReconfigurationRequestSidelink message

```
-- ASN1START
-- TAG-RRCRECONFIGURATIONREQUESTSIDELINK-START
RRCReconfigurationRequestSidelink ::=        SEQUENCE {
    rrc-TransactionIdentifier-r17            RRC-TransactionIdentifier,
    criticalExtensions                       CHOICE {
        rrcReconfigurationRequestSidelink-r17    RRCReconfigurationRequestSidelink-
IEs-r17,
        criticalExtensionsFuture             SEQUENCE { }
    }
}
RRCReconfigurationRequestSidelink-IEs-r17 ::=    SEQUENCE {
    ADCS-RelayRelease-Indication-r17             ENUMERATED {TRUE}
    OPTIONAL,
    lateNonCriticalExtension                 OCTET STRING   OPTIONAL,
    nonCriticalExtension                     SEQUENCE { }
    OPTIONAL
}
-- TAG-RRCRECONFIGURATIONSIDELINK-STOP
-- ASN1STOP
``` the L2 identifier, the ProSe UE ID, or a combination of the L2 identifier and the ProSe UE ID.

When the connection configuration between the transmitting terminal and the second relay terminal has been completed, the transmitting terminal may transmit, to the first relay terminal, a second message including information of the second relay terminal (e.g., identifier of the second relay terminal) and/or a relay configuration completion indicator indicating that the connection configuration between the transmitting terminal and the second relay has been completed (S805). In addition, the second message may further include ADCS-RelayRelease-Indication to indicate that data transmission through the first relay terminal is performed until data transmission through the new relay terminal is performed. The second message may be transmitted to the receiving terminal through the first relay terminal. That is, the second message may be used to inform the receiving terminal of the information of the second relay terminal (i.e., new relay terminal).

The second message may be an RRCReconfiguration-Sidelink message defined in Table 9 below, and may include one or more information elements listed in Table 9 below. In the S805, another RRC message (e.g., a new RRC message) may be used instead of the RRCReconfigurationSidelink message. Alternatively, the second message may be a MAC CE and/or control information.

the transmitting terminal and the relay terminal indicated by sl-RelayUE-Identity has been completed. The RelayLink-Refresh-Indication may be expressed in ENUMERATED or BOOLEAN type.

The first relay terminal may receive the second message from the transmitting terminal. The first relay terminal may identify information elements included in the second message (e.g., information of the second relay terminal, relay configuration completion indicator, and/or relay release indicator). The first relay terminal may transmit the second message to the receiving terminal (S806). The information elements included in the second message transmitted from the first relay terminal may be the same as the information elements included in the second message transmitted from the transmitting terminal. Alternatively, the information elements included in the second message transmitted from the first relay terminal may be different from the information elements included in the second message transmitted from the transmitting terminal. For example, the second message transmitted from the first relay terminal may further include information (e.g., identifier) of the transmitting terminal delivering information of the new relay terminal (e.g., second relay terminal).

The second message transmitted from the first relay terminal may be an RRCReconfigurationSidelink message defined in Table 10 below, and may include one or more

TABLE 9

| RRCReconfigurationSidelink message |
| --- |
| -- ASN1START |
| -- TAG-RRCRECONFIGURATIONSIDELINK-START |
| RRCReconfigurationSidelink ::=          SEQUENCE { |
|    rrc-TransactionIdentifier-r16          RRC-TransactionIdentifier, |
|    criticalExtensions          CHOICE { |
|       rrcReconfigurationSidelink-r16          RRCReconfigurationSidelink-IEs-r16, |
|       criticalExtensionsFuture          SEQUENCE { } |
|    } |
| } |
| RRCReconfigurationSidelink-IEs-r16 ::=          SEQUENCE { |
|    slrb-ConfigToAddModList-r16          SEQUENCE (SIZE (1..maxNrofSLRB-r16)) OF |
| SLRB-Config-r16          OPTIONAL, |
|    slrb-ConfigToReleaseList-r16          SEQUENCE (SIZE (1..maxNrofSLRB-r16)) OF |
| SLRB-PC5-ConfigIndex-r16          OPTIONAL, |
|    sl-MeasConfig-r16          SL-MeasConfig-r16   OPTIONAL, |
|    sl-CSI-RS-Config-r16          SL-CSI-RS-Config-r16 |
|    OPTIONAL, |
|    lateNonCriticalExtension          OCTET STRING |
|    OPTIONAL, |
|    nonCriticalExtension          RRCReconfigurationSidelink-IEs-r17 |
|    OPTIONAL |
| } |
| RRCReconfigurationSidelink-IEs-r17 ::=          SEQUENCE { |
|    ADCS-RelayRelease-Indication-r17          ENUMERATED {TRUE} |
|       OPTIONAL, |
|    sl-RelayUE-Identity-r17          SL-RelayUE-Identity-r17 |
|       OPTIONAL, |
|    RelayLinkRefresh-Indication-r17          ENUMERATED {Re-established, Not- |
| reestablished}   OPTIONAL, |
|    ... |
| } |
| ... Omitted ... |

In Table 9, sl-RelayUE-Identity may be the identifier of the second relay terminal (i.e., new relay terminal). In Table 9, RelayLinkRefresh-Indication may be the relay configuration completion indicator. The RelayLinkRefresh-Indication may indicate that the connection configuration between information elements listed in Table 10 below. In Table 10 below, sl-SourceUE-Identity may be the identifier of the transmitting terminal. The identifier of the transmitting terminal may be the L2 identifier, ProSe UE ID, ProSe application code, and/or ProSe application ID.

TABLE 10

| RRCReconfigurationSidelink message |
|---|

```
-- ASN1START
-- TAG-RRCRECONFIGURATIONSIDELINK-START
RRCReconfigurationSidelink ::=          SEQUENCE {
    rrc-TransactionIdentifier-r16           RRC-TransactionIdentifier,
    criticalExtensions                      CHOICE {
        rrcReconfigurationSidelink-r16          RRCReconfigurationSidelink-IEs-r16,
        criticalExtensionsFuture                SEQUENCE { }
    }
}
RRCReconfigurationSidelink-IEs-r16 ::=  SEQUENCE {
    slrb-ConfigToAddModList-r16                 SEQUENCE (SIZE (1..maxNrofSLRB-r16)) OF
SLRB-Config-r16                         OPTIONAL,
    slrb-ConfigToReleaseList-r16                SEQUENCE (SIZE (1..maxNrofSLRB-r16)) OF
SLRB-PC5-ConfigIndex-r16                OPTIONAL,
    sl-MeasConfig-r16                           SL-MeasConfig-r16    OPTIONAL,
    sl-CSI-RS-Config-r16                        SL-CSI-RS-Config-r16
    OPTIONAL,
    lateNonCriticalExtension                    OCTET STRING
    OPTIONAL,
    nonCriticalExtension                        RRCReconfigurationSidelink-IEs-r17
    OPTIONAL
}
RRCReconfigurationSidelink-IEs-r17 ::=  SEQUENCE {
    ADCS-RelayRelease-Indication-r17            ENUMERATED {TRUE}
        OPTIONAL,
    sl-SourceUE-Identity-r17                    SL-SourceUE-Identity-r17
        OPTIONAL,
    sl-RelayUE-Identity-r17                 SL-RelayUE-Identity-r17
        OPTIONAL,
    RelayLinkRefresh-Indication-r17             ENUMERATED {Re-established, Not-
reestablished}    OPTIONAL,
    ...
}
... Omitted ...
```

The receiving terminal may receive the second message of the transmitting terminal from the first relay terminal, and identify the information elements included in the second message (e.g., information of the second relay terminal, relay configuration completion indicator, relay release indicator, and/or information of the transmitting terminal). The receiving terminal may identify that the configuration of the connection (e.g., unicast link) between the transmitting terminal and the second relay terminal (e.g., new relay terminal) has been completed based on the information elements included in the second message. The receiving terminal may perform a discovery procedure for the second relay terminal indicated by the information element included in the second message (S807). For example, the receiving terminal may identify identifier(s) of neighboring relay terminal(s) by receiving signal(s) and/or channel(s) from the neighboring relay terminal(s). The signal may be a discovery signal, synchronization signal, and/or reference signal, and the channel may be a discovery channel.

The receiving terminal may compare the identifier(s) of the neighboring relay terminal(s) with the identifier of the second relay terminal included in the second message. Here, the higher layer of the receiving terminal may compare Prose UE ID(s) (e.g., ProSe application code(s) or ProSe application ID(s)) of the neighboring relay terminal(s) and the ProSe UE ID (e.g., ProSe application code or ProSe application ID) of the second relay terminal. Alternatively, the lower layer (e.g., L2) of the receiving terminal may compare L2 identifier(s) of the neighboring relay terminal(s) with the L2 identifier of the second relay terminal.

When a neighboring relay terminal having the same identifier as that of the second relay terminal is identified, the receiving terminal may determine the identified neighboring relay terminal as the second relay terminal. The receiving terminal may configure a connection (e.g., PC5 connection, PC5-S connection, or unicast link) with the second relay terminal (S808). When the connection configuration between the receiving terminal and the second relay terminal has been completed, the receiving terminal may transmit, to the first relay terminal, information of the second relay terminal (e.g., identifier of the second relay terminal) and/or a relay configuration completion indicator indicating that the connection configuration between the receiving terminal and the second relay terminal has been completed (S809). The third message may be transmitted to the transmitting terminal through the first relay terminal. The third message may be an RRCReconfigurationCompleteSidelink message defined in Table 11 below, and may include one or more information elements listed in Table 11 below. In the step S809, another RRC message (e.g., a new RRC message) may be used instead of the RRCReconfigurationCompleteSidelink message. Alternatively, the third message may be a MAC CE and/or control information. In Table 11 below, sl-RelayUE-Identity may be the identifier of the second relay terminal, and in Table 11 below, Relay-LinkRefresh-Indication may be the relay configuration completion indicator. The RelayLinkRefresh-Indication may be expressed in ENUMERATED or BOOLEAN type.

TABLE 11

| RRCReconfigurationCompleteSidelink message |
| --- |
| -- ASN1START |
| -- TAG-RRCRECONFIGURATIONCOMPLETESIDELINK-START |
| RRCReconfigurationCompleteSidelink ::=            SEQUENCE { |
|    rrc-TransactionIdentifier-r16               RRC-TransactionIdentifier, |
|    criticalExtensions                   CHOICE { |
|       rrcReconfigurationCompleteSidelink-r16      RRCReconfigurationCompleteSidelink- |
| IEs-r16, |
|       criticalExtensionsFuture          SEQUENCE { } |
|    } |
| } |
| RRCReconfigurationCompleteSidelink-IEs-r16 ::= SEQUENCE { |
|    lateNonCriticalExtension              OCTET STRING |
| OPTIONAL, |
|    nonCriticalExtension                RRCReconfigurationSidelink-IEs-r17 |
|    OPTIONAL |
| } |
| RRCReconfigurationSidelink-IEs-r17 ::=     SEQUENCE { |
|    sl-RelayUE-Identity-r17            SL-RelayUE-Identity-r17 |
|       OPTIONAL, |
|    RelayLinkRefresh-Indication-r17       ENUMERATED {Re-established, Not- |
| reestablished}   OPTIONAL, |
|    ... |
| } |
| -- TAG-RRCRECONFIGURATIONCOMPLETESIDELINK-STOP |
| -- ASN1STOP |

Meanwhile, during and/or after performing the connection configuration operation between the receiving terminal and the second relay terminal, the receiving terminal may receive data of the transmitting terminal through the first relay terminal. In this case, a number for identifying data received last from the transmitting terminal may continue to change. Therefore, the number for identifying the data received last from the transmitting terminal may not be included in the third message.

The first relay terminal may receive the third message from the receiving terminal. The first relay terminal may identify information elements included in the third message (e.g., information of the second relay terminal and/or relay configuration completion indicator). The first relay terminal may transmit the third message to the transmitting terminal (S810). The information elements included in the third message transmitted from the first relay terminal may be the same as the information elements included in the third message transmitted from the receiving terminal. Alternatively, the information elements included in the third message transmitted from the first relay terminal may be different from the information elements included in the third message transmitted from the receiving terminal. For example, the third message transmitted from the first relay terminal may further include information (e.g., identifier) of the receiving terminal delivering information of the new relay terminal (e.g., second relay terminal). The third message transmitted from the first relay terminal may be an RRCReconfigurationCompleteSidelink message defined in Table 12 below, and may include one or more information elements listed in Table 12 below. In Table 12 below, sl-DestinationUE-Identity may be the identifier of the receiving terminal. The identifier of the receiving terminal may be the L2 identifier, ProSe UE ID, ProSe application code, and/or ProSe application ID.

TABLE 12

| RRCReconfigurationCompleteSidelink message |
| --- |
| -- ASN1START |
| -- TAG-RRCRECONFIGURATIONCOMPLETESIDELINK-START |
| RRCReconfigurationCompleteSidelink ::=         SEQUENCE { |
|    rrc-TransactionIdentifier-r16          RRC-TransactionIdentifier, |
|    criticalExtensions             CHOICE { |
|       rrcReconfigurationCompleteSidelink-r16    RRCReconfigurationCompleteSidelink- |
| IEs-r16, |
|       criticalExtensionsFuture        SEQUENCE { } |
|    } |
| } |
| RRCReconfigurationCompleteSidelink-IEs-r16 ::= SEQUENCE { |
|    lateNonCriticalExtension          OCTET STRING |
| OPTIONAL, |
|    nonCriticalExtension           RRCReconfigurationSidelink-IEs-r17 |
|    OPTIONAL |
| } |
| RRCReconfigurationSidelink-IEs-r17 ::=   SEQUENCE { |
|    sl-DestinationUE-Identity-r17       SL-SourceUE-Identity-r17 |
|       OPTIONAL, |
|    sl-RelayUE-Identity-r17         SL-RelayUE-Identity-r17 |
|       OPTIONAL, |

TABLE 12-continued

| RRCReconfigurationCompleteSidelink message |
| --- |

RelayLinkRefresh-Indication-r17      ENUMERATED {Re-established, Not-
reestablished}  OPTIONAL,

...
}
-- TAG-RRCRECONFIGURATIONCOMPLETESIDELINK-STOP
-- ASN1STOP

Meanwhile, after transmitting the third message to the transmitting terminal, the first relay terminal may transmit, to the receiving terminal, a number for identifying data received last from the transmitting terminal and/or a number for identifying data transmitted last to the receiving terminal during a preconfigured period. The preconfigured period may be a period from a time when the first relay terminal transmits the third message to a time when the transmitting terminal receives the third message. The first relay terminal may inform the receiving terminal of the last data number using at least one of an RRC message, MAC CE, or control information. The above-described operation may be performed before releasing the connection (e.g., unicast link) between the transmitting terminal and the first relay terminal and the connection (e.g., unicast link) between the receiving terminal and the first relay terminal. For example, the first relay terminal may release the connection between the transmitting terminal and the first relay terminal and the connection between the receiving terminal and the first relay terminal after notifying the receiving terminal of the last data number.

The receiving terminal may receive information on the last data number from the first relay terminal, and based on the last data number, the receiving terminal may identify whether data has been lost in the SL relay communication through the first relay terminal. When the number for identifying the data last received from the first relay terminal is the same as the last data number indicated by the first relay terminal, the receiving terminal may determine that data has not been lost in the SL relay communication. When the number for identifying the data last received from the first relay terminal is different from the last data number indicated by the first relay terminal, the receiving terminal may determine that data has been lost in the SL relay communication. In this case, the receiving terminal may inform the transmitting terminal of the number (e.g., the last data number) for identifying the data received last from the first relay terminal through the first relay terminal.

After notifying the transmitting terminal of the last data number, the first relay terminal may release the connection between the transmitting terminal and the first relay terminal and the connection between the receiving terminal and the first relay terminal. In addition, the transmitting terminal may release the connection configuration between the transmitting terminal and the first relay terminal after receiving the third message and/or the data corresponding to the last data number. The receiving terminal may release the connection configuration between the receiving terminal and the first relay terminal after transmitting the third message and/or the data corresponding to the last data number. The receiving terminal may request the transmitting terminal to retransmit the data corresponding to the last data number by informing the transmitting terminal of the last data number. The last data number may be transmitted using at least one of an RRC message, MAC CE, or control information.

According to the above operations, service continuity can be guaranteed even when the relay terminal is changed.

On the other hand, the transmitting terminal may receive the third message from the first relay terminal, and identify information elements included in the third message (e.g., information of the second relay terminal, relay configuration completion indicator, and/or information of the receiving terminal). The transmitting terminal may identify that the connection configuration between the receiving terminal and the second relay terminal has been completed based on the information elements included in the third message. In this case, SL relay communication between the transmitting terminal, the second relay terminal, and the receiving terminal may be performed (S811). The transmitting terminal may transmit new data to the receiving terminal through the second relay terminal, and the receiving terminal may receive the new data of the transmitting terminal through the second relay terminal. When data has been lost in the SL relay communication through the first relay terminal, the transmitting terminal may retransmit the lost data to the receiving terminal through the second relay terminal before transmitting new data. On the other hand, when the third message of the receiving terminal is not received, the transmitting terminal may not be able to perform SL relay communication through the second relay terminal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:
1. An operation method of a transmitting terminal in a communication system, the operation method comprising:
  performing first sidelink (SL) relay communication with
    a receiving terminal through a first relay terminal;

receiving, from the first relay terminal, a first message including a relay release indicator;

in response to receiving the first message, configuring a connection between the transmitting terminal and a second relay terminal;

transmitting, to the receiving terminal through the first relay terminal which is a previous relay terminal whose connection configuration with the transmitting terminal has not been released, a second message including a first relay configuration completion indicator indicating that connection configuration between the transmitting terminal and the second relay terminal has been completed and a number for identifying data transmitted last by the transmitting terminal to the receiving terminal through the first relay terminal;

receiving, through the first relay terminal which is the previous relay terminal whose connection configuration with the transmitting terminal has not been released, a third message including a second relay configuration completion indicator indicating that connection configuration between the receiving terminal and the second relay terminal has been completed; and in response to receiving the third message, performing second SL relay communication with the receiving terminal through the second relay terminal.

2. The operation method according to claim 1, wherein when the first message is received, a transmission operation for data of the transmitting terminal through the first relay terminal is stopped.

3. The operation method according to claim 1, wherein even when the first message is received, a transmission operation for data of the transmitting terminal through the first relay terminal is performed, and the transmission operation is stopped after receiving the third message.

4. The operation method according to claim 1, wherein the second message further includes information of the second relay terminal.

5. The operation method according to claim 1, wherein the third message further includes at least one of information of the receiving terminal, information of the second relay terminal, or a number for identifying data received last by the receiving terminal.

6. The operation method according to claim 1, wherein the configuring of the connection between the transmitting terminal and the second relay terminal comprises:

discovering one or more neighboring relay terminals;

determining one neighboring relay terminal among the one or more discovered neighboring relay terminals as the second relay terminal; and configuring a connection with the second relay terminal.

7. The operation method according to claim 1, wherein the performing of the second SL relay communication comprises:

transmitting data lost in the first SL relay communication to the receiving terminal through the second relay terminal; and transmitting new data to the receiving terminal through the second relay terminal.

8. The operation method according to claim 1, wherein when the third message is received, the connection configuration between the transmitting terminal and the first relay terminal is released.

9. An operation method of a first relay terminal in a communication system, the operation method comprising:

performing sidelink (SL) relay communication between a transmitting terminal and a receiving terminal;

transmitting, to the transmitting terminal, a first message including a relay release indicator when the SL relay communication is not supported;

receiving, from the transmitting terminal in a first link between the transmitting terminal and the first relay terminal which is not released, a second message including a first relay configuration completion indicator indicating that connection configuration between the transmitting terminal and a second relay terminal has been completed and a number for identifying data transmitted last by the transmitting terminal to the receiving terminal through the first relay terminal;

transmitting, to the receiving terminal in a second link between the receiving terminal and the first relay terminal which is not released, the second message;

receiving, from the receiving terminal in the second link, a third message including a second relay configuration completion indicator indicating that connection configuration between the receiving terminal and the second relay terminal has been completed;

transmitting, to the transmitting terminal in the first link, the third message; and after transmitting the third message, releasing the connection configuration between the transmitting terminal and the first relay terminal and the connection configuration between the receiving terminal and the first relay terminal.

10. The operation method according to claim 9, wherein after transmitting the first message, a relay operation for data of the transmitting terminal is stopped.

11. The operation method according to claim 9, wherein even after transmitting the first message, a relay operation for data of the transmitting terminal is performed, and the relay operation is stopped after transmitting the third message.

12. The operation method according to claim 9, wherein the second message further includes at least one of information of the transmitting terminal or information of the second relay terminal.

13. The operation method according to claim 9, wherein the third message further includes at least one of information of the receiving terminal, information of the second relay terminal, or a number for identifying data received last by the receiving terminal.

14. An operation method of a receiving terminal in a communication system, the operation method comprising:

performing first sidelink (SL) relay communication with a transmitting terminal through a first relay terminal;

receiving, through the first relay terminal which is a previous relay terminal whose connection configuration with the receiving terminal has not been released, a second message including a first relay configuration completion indicator indicating that connection configuration between the transmitting terminal and the second relay terminal has been completed and a number for identifying data transmitted last by the transmitting terminal to the receiving terminal through the first relay terminal;

configuring a connection with the second relay terminal indicated by the second message;

transmitting, to the transmitting terminal through the first relay terminal which is the previous relay terminal whose connection configuration with the receiving terminal has not been released, a third message including a second relay configuration completion indicator indicating that connection configuration between the receiving terminal and the second relay terminal has been completed; and after transmitting the third message, performing second SL relay communication with the transmitting terminal through the second relay terminal.

15. The operation method according to claim 14, further comprising, before receiving the second message, receiving, from the first relay terminal, a first message including a relay release indicator.

16. The operation method according to claim 15, wherein when the first message is received, a reception operation for data of the transmitting terminal relayed by the first relay terminal is stopped.

17. The operation method according to claim 15, wherein even when the first message is received, a reception operation for data of the transmitting terminal relayed by the first relay terminal is performed, and the reception operation is stopped after transmitting the third message.

18. The operation method according to claim 14, wherein the second message further includes at least one of information of the transmitting terminal or information of the second relay terminal.

19. The operation method according to claim 14, wherein the third message further includes at least one of information of the second relay terminal or a number for identifying data received last by the receiving terminal.

20. The operation method according to claim 14, wherein the performing of the second SL relay communication comprises:

receiving data lost in the first SL relay communication through the second relay terminal; and receiving new data of the transmitting terminal through the second relay terminal.

* * * * *